(No Model.)

J. M. BASINGER.
PAD CHECK HOOK.

No. 367,587. Patented Aug. 2, 1887.

Witnesses:
Theo. L. Popp.
Chas. J. Buchheit.

James M. Basinger, Inventor.
By Wilhelm Bonner
Attorneys.

N. PETERS. Photo-Lithographer, Washington, D. C.

UNITED STATES PATENT OFFICE.

JAMES M. BASINGER, OF BUFFALO, NEW YORK, ASSIGNOR OF ONE-HALF TO HARVEY D. BLAKESLEE, OF SAME PLACE.

PAD CHECK-HOOK.

SPECIFICATION forming part of Letters Patent No. 367,587, dated August 2, 1887.

Application filed March 9, 1887. Serial No. 230,192. (No model.)

*To all whom it may concern:*

Be it known that I, JAMES M. BASINGER, of the city of Buffalo, in the county of Erie and State of New York, have invented new and useful Improvements in Pad Check-Hooks, of which the following is a specification.

This invention relates to pad check-hooks which are attached to soft pads—that is, pads having no metallic plate—and in which the shank of the hook is confined between the two straps which form the pad by a screw-bolt inserted through the upper strap and into the shank of the hook, the end of the shank being provided with a loop for attachment of the crupper or back-strap of the harness.

In making up a harness with a check-hook of this kind the shank of the hook is required to be placed between the pad-straps before the straps are sewed together. When the shank of the hook is arranged in place between the straps, the hook projects over the top strap and renders the operation of sewing the two straps near the shank slow and tedious, as well as difficult, and, in the event of breakage of the hook when in use, the straps have to be separated by cutting the stitches before the broken hook can be removed, and when replaced by a new hook the straps have to be sewed together as before.

The object of my invention is to construct a check-hook of this kind which can be readily secured in place between the pad-straps after the latter have been sewed together and be easily removed therefrom when desired for replacing a new hook.

The invention consists of the improvements which will be hereinafter fully set forth, and pointed out in the claims.

Figure 1:
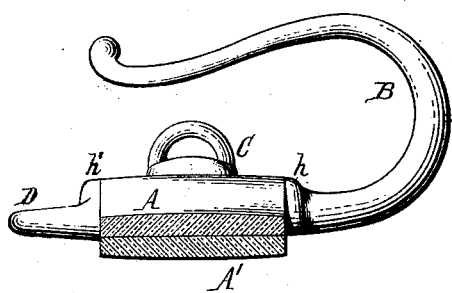
Figure 2:
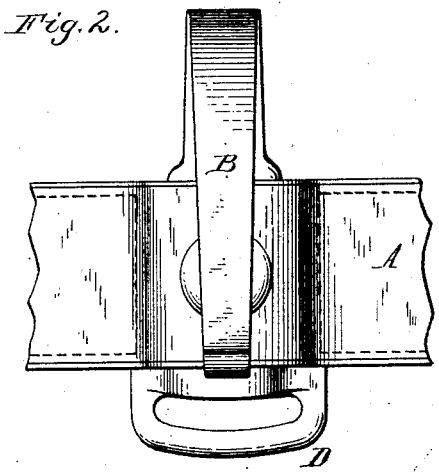
Figure 3:
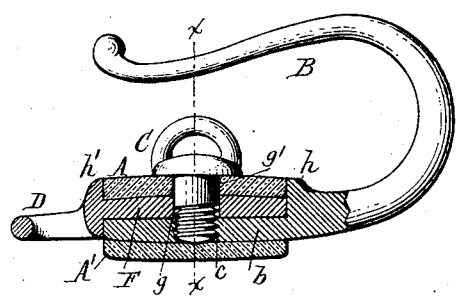
Figure 4:
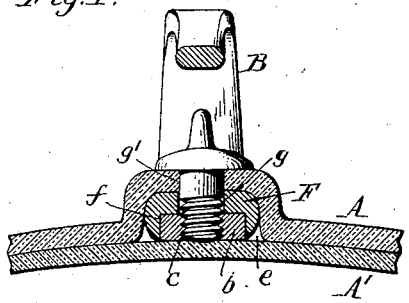
Figure 5:
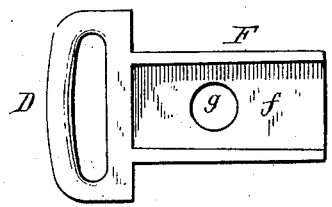
Figure 6:
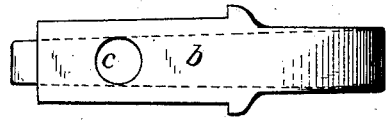
Figure 7:
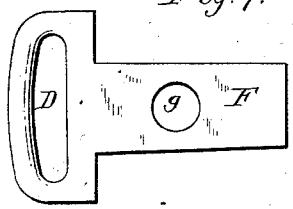
Figure 8:
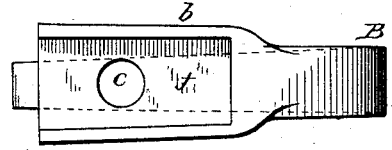

In the accompanying drawings, Figure 1 is a side elevation, and Fig. 2 a top plan view, of my improved check-hook attached to the pad. Fig. 3 is a longitudinal sectional elevation thereof. Fig. 4 is a cross-section in line $x\,x$, Fig. 3. Fig. 5 is a bottom plan view of the end loop of the hook. Fig. 6 is a bottom plan view of the shank of the hook. Figs. 7 and 8 are similar views to Figs. 4 and 5, showing a modified construction of my improved check-hook.

Like letters of reference refer to like parts in the several figures.

A A' represent the pad-straps of the harness, and B my improved check-hook attached thereto. The hook B is provided with a shank, $b$, which is inserted between the two pad-straps A A', and is held in place by a screw-bolt, C, which passes through the upper pad-strap and is secured in a threaded socket, $c$, formed in the shank of the hook in the usual manner.

D represents the loop formed at the end of the shank $b$ for attachment of the crupper or back-strap of the harness.

The straps A A' are sewed together by rows of stitches near the edges of the straps, leaving a space, $e$, through which the shank $b$ passes.

Instead of casting the loop D on the end of the shank $b$, the loop is formed in a separate piece from the shank, and is provided with a tongue or plate, F, projecting laterally from one side of the loop. The tongue F is provided on its under side with a recess, $f$, which fits over the shank $b$ of the hook and is secured thereto by the screw-bolt C. The tongue F is provided with an opening, $g$, and the upper pad-strap, A, with a similar opening, $g'$, both openings $g\ g'$ being arranged in line with the threaded socket $c$ of the shank when the parts are arranged in place, as shown in Figs. 3 and 4, to permit the end of the screw-bolt C to be inserted through the openings $g\,g'$ in the upper strap, A, and tongue F and engage in the socket $c$ of the shank of the hook. Upon tightening the bolt C the parts are firmly secured together.

$h$ represents a shoulder formed on the upper side of the shank $b$ and bearing against the front edge of the pad-strap A when the shank is inserted in place between the straps, and $h'$ represents a similar shoulder formed on the loop D on the side adjacent to the tongue F and bearing against the opposite edge of the pad-strap A when the loop is secured in place.

To attach the hook to the pad, the plate or tongue F of the loop is inserted from the rear side or edge of the pad into the space $e$ between the straps until the shoulder $h'$ bears against the edge of the upper strap, A. The shank $b$ of the hook is then inserted from the front side of the pad into the recess $f$ of the plate until the shoulder $h$ bears against the front edge of the strap A. When the parts are in this position, the openings $g\ g'$ are in line with the socket $c$, and are secured in place by the bolt C, as before described. The shank $b$ of the pad-hook and the tongue-plate F are made straight in their longitudinal directions, so that they can be inserted between the straps composing the pad by a simple movement in the longitudinal direction. Upon withdrawing the screw-bolt C the parts can be readily detached and removed from the pad when desired without defacing the pad. If preferred, the tongue or plate F may be constructed without the recess $f$ and the recess be formed in the under side of the shank $b$ to receive the tongue or plate of the loop, as shown in Figs. 7 and 8.

My improved check-hook can be formed at comparately small expense, and permits the pad to be made up before attaching the hook to the pad.

I claim as my invention—

1. The combination, with a pad-hook provided with a straight shank, $b$, having an opening, $c$, of a straight loop-plate, F, provided with an opening, $g$, and a detached fastening-screw, C, whereby the plate of the pad-hook and the loop-plate can be inserted into the pad from opposite sides thereof and be secured together after being inserted, substantially as set forth.

2. The combination, with the hook B, provided with a shank, $b$, having a threaded socket, $c$, and a shoulder, $h$, of a loop, D, provided with a plate, F, and shoulder $h'$, a recess, $f$, formed in the plate and adapted to receive the shank of the hook, and a screw-bolt, C, whereby the shank is secured in the recess $f$ of the plate, substantially as set forth.

Witness my hand this 1st day of March, 1887.

JAMES M. BASINGER.

Witnesses:
JNO. J. BONNER,
GEO. J. BUCHHEIT, Jr.